(12) United States Patent
Akaogi (10) Patent No.: US 10,829,383 B2
(45) Date of Patent: Nov. 10, 2020

(54) GIS-TYPE ZEOLITE

(71) Applicant: ASAHI KASEI KABUSHIKI KAISHA, Tokyo (JP)

(72) Inventor: Takayuki Akaogi, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/646,750

(22) PCT Filed: Mar. 27, 2019

(86) PCT No.: PCT/JP2019/013171
§ 371 (c)(1),
(2) Date: Mar. 12, 2020

(87) PCT Pub. No.: WO2019/202933
PCT Pub. Date: Oct. 24, 2019

(65) Prior Publication Data
US 2020/0223706 A1    Jul. 16, 2020

(30) Foreign Application Priority Data
Apr. 16, 2018 (JP) .................. 2018-078435

(51) Int. Cl.
*C01B 39/46* (2006.01)
*B01J 20/18* (2006.01)
(Continued)

(52) U.S. Cl.
CPC ............ *C01B 39/46* (2013.01); *B01D 53/047* (2013.01); *B01D 53/0462* (2013.01); *B01J 20/18* (2013.01);
(Continued)

(58) Field of Classification Search
CPC ... C01B 39/026; C01B 39/46; C01P 2002/72; C01P 2002/74; B01J 20/18; B01J 20/186;
(Continued)

(56) References Cited

U.S. PATENT DOCUMENTS

2012/0108415 A1   5/2012  Herrmann et al.
2020/0223706 A1*  7/2020  Akaogi ............... B01D 53/047

FOREIGN PATENT DOCUMENTS

| CN | 105460953 A | 4/2016 |
|---|---|---|
| JP | 6-340417 A | 12/1994 |
| JP | 2012-519148 A | 8/2012 |
| KR | 10-1444939 B1 | 9/2014 |

OTHER PUBLICATIONS

Celestian et al., "Time-Resolved Diffraction Studies of Ion Exchange: $K^+$ and $Na^+$ Exchange into (Al, Ge) Gismondine (GIS) $Na_{24}Al_{24}Ge_{24}O_{96}\cdot4H_2O$ and $K_8Al_8Ge_8O_{32}\cdot8H_2O$)," Chem. Mater. (2004), pp. 2244-2254.
(Continued)

*Primary Examiner* — David M Brunsman
(74) *Attorney, Agent, or Firm* — Birch, Stewart, Kolasch & Birch, LLP (57) ABSTRACT

A GIS-type zeolite, having a diffraction peak of (1 0 1) at a diffraction angle 2θ=12.55 to 12.90° in a spectrum obtained by X-ray diffraction.

8 Claims, 2 Drawing Sheets

(51) Int. Cl.
*B01D 53/04* (2006.01)
*B01D 53/047* (2006.01)
*C01B 39/02* (2006.01)
*B01J 20/16* (2006.01)
*B01D 53/82* (2006.01)

(52) U.S. Cl.
CPC .......... *B01J 20/186* (2013.01); *C01B 39/026* (2013.01); *B01D 53/82* (2013.01); *B01D 2257/11* (2013.01); *B01D 2257/2025* (2013.01); *B01D 2257/2045* (2013.01); *B01D 2257/406* (2013.01); *B01D 2257/504* (2013.01); *B01D 2257/80* (2013.01); *B01J 20/165* (2013.01); *C01P 2002/72* (2013.01); *C01P 2002/74* (2013.01)

(58) Field of Classification Search
CPC .. B01J 20/165; B01D 53/047; B01D 53/0462; B01D 53/82; B01D 2257/504
See application file for complete search history.

(56) References Cited

OTHER PUBLICATIONS

Hernandez-Maldonado, A. J. and R. T. Yang, "Partically Calcined Gismondine Type Silicoaluminophosphate SAPO-43: Isopropylamine Elimination and Separation of Carbon Dioxide, Hydrogen Sulfide, and Water," Langmuir (2003), vol. 19, pp. 2193-2200.
International Search Report dated Jun. 25, 2019, in PCT/JP2019/013171.
Oleksiak et al., "Synthesis Strategies for Ultrastable Zeolite GIS Polymorphs as Sorbents for Selective Separations," Chem. Eur. J. (2016), vol. 22, pp. 16078-16088.
Sharma et al., "Knobby surfaced, mesoporous, single-phase GIS-NaP1 zeolite microsphere synthesis and characterization for H2 gas adsorption," J. Mater. Chem. A (2013), vol. 1, pp. 2602-2612.
Azizi et al., "Phase Transformation of Zeolite P to Y and Analcime Zeolites due to Changing the Time and Temperature," Journal of Spectroscopy, vol. 2013, 2013, pp. 1-5 (6 pages total).

* cited by examiner

GIS-TYPE ZEOLITE

This application is a 371 filing of PCT/JP2019/013171, filed Mar. 27, 2019.

TECHNICAL FIELD

The present invention relates to a GIS-type zeolite.

BACKGROUND ART

Zeolite can be used for adsorbing materials, desiccants, separating agents, catalysts, catalyst carriers, detergent aids, ion exchangers, waste water treatment agents, fertilizers, food additives, cosmetic additives and the like, and, in particular, is useful in gas separation applications.

A GIS-type zeolite is disclosed in each of Patent Literatures 1 to 2 and Non-Patent Literatures 1 to 3. Such a GIS-type zeolite here has a GIS structure in codes for directing zeolite structures specified by the International Zeolite Association (IZA).

A GIS-type zeolite is a zeolite having a pore constituted by an oxygen 8-membered ring. Patent Literature 1 describes synthesis of a GIS-type zeolite for effective use of slag of coal burnt ash, and Patent Literature 2 describes an enhancement in thermal conductivity by formation of a zeolite film (GIS-type zeolite) on the surface of an aluminum plate. Non-Patent Literatures 1 and 2 each disclose a GIS-type zeolite of silica/alumina, and adsorption of carbon dioxide is not almost found in all of such disclosures. Non-Patent Literature 3 discloses a GIS-type zeolite of silicoaluminophosphate containing phosphoric acid, and reported that not only adsorption of carbon dioxide, but also adsorption of oxygen, nitrogen and methane were observed.

CITATION LIST

Patent Literatures

Patent Literature 1: Japanese Patent Laid-Open No. 06-340417
Patent Literature 2: National Publication of International Patent Application No. 2012-519148

Non-Patent Literatures

Non-Patent Literature 1: Matthew D. Oleksiak, Arian Ghorbanpour, Marlon T. Conato, B. Peter McGrail, Lars C. Grabow, Radha Kishan Motkuri, Jeffrey D. Rimer "Synthesis Strategies for Ultrastable Zeolite GIS Polymorphs as Sorbents for Selective Separations" Chem. Eur. J. 2016, 22, 16078-16088.
Non-Patent Literature 2: Pankaj Sharma, Jeong-gu Yeo, Moon Hee Han, Churl Hee Cho "Knobby surfaced, mesoporous, single-phase GIS-NaP1 zeolite microsphere synthesis and characterization for H2 gas adsorption" J. Mater. Chem. A, 2013, 1, 2602-2612.
Non-Patent Literature 3: Arturo J. Hernandez-Maldonado, Ralph T. Yang, Daniel Chinn, Curtis L. Munson. "Partially Calcined Gismondine Type Silicoaluminophosphate SAPO-43: Isopropylamine Elimination and Separation of Carbon Dioxide, Hydrogen Sulfide, and Water" Langmuir 2003, 19, 2193-2200.

SUMMARY OF INVENTION

Technical Problem

Focusing on the carbon dioxide adsorption ability of a GIS-type zeolite, for example, the GIS-type zeolite is remarkable in industrial usability if it can selectively remove carbon dioxide from natural gas. The amount of emission of carbon dioxide can also be reduced if carbon dioxide can be selectively removed from exhaust gas from a power plant and/or a steel plant.

Meanwhile, Patent Literatures 1 to 2 have not mentioned any adsorption of carbon dioxide by zeolite, and it is hardly said according to the structure analysis results shown in such Literatures that a crystal structure necessary for selective adsorption of carbon dioxide is clearly formed. That is, it is considered that the zeolite described in Patent Literatures 1 to 2 is not sufficient in adsorption ability of carbon dioxide and is also low in selectivity of adsorption of carbon dioxide relative to adsorption of methane.

In addition, the zeolite shown in Non-Patent Literatures 1 to 2 does not provide adsorption of carbon dioxide, and cannot separate carbon dioxide and molecules larger in the size than carbon dioxide, such as oxygen, nitrogen and methane, by adsorption and/or gas penetration. As the reason for this, it is assumed that an 8-membered ring of a GIS-type zeolite is distorted and has an elliptical shape where the length of the longer axis is 4.5 Å and the length of the shorter axis is 3.1 Å, and a carbon dioxide molecule having an average molecular size of 3.3 Å cannot easily penetrate into a pore. Non-Patent Literature 3 discloses a GIS-type zeolite of silicoaluminophosphate, in which the binding distance and the binding angle are different from those of silica/alumina, thus the 8-membered ring pore is slightly large and adsorption of carbon dioxide can be observed, but adsorption of oxygen, nitrogen and methane cannot be said to be sufficiently low, and thus the selection rate in terms of separation of carbon dioxide is lowered.

The present invention has been made in view of the above circumstances, and an object thereof is to provide a GIS-type zeolite which can sufficiently adsorb carbon dioxide ($CO_2$) and which is also high in selectivity of adsorption of carbon dioxide relative to the amount of adsorption of methane ($CH_4$).

Solution to Problem

The present inventors have made intensive studies in order to solve the above problems, and as a result, have found that the above problems can be solved in a case where the diffraction angle 2θ of a specific diffraction peak in a diffraction pattern obtained by subjecting a GIS-type zeolite to X-ray diffraction measurement is observed within a predetermined value range, leading to completion of the present invention.

That is, the present invention is as follows.

[1]
A GIS-type zeolite, having a diffraction peak of (1 0 1) at a diffraction angle 2θ=12.55 to 12.90° in a spectrum obtained by X-ray diffraction.
[2]
The GIS-type zeolite according to [1], having a diffraction peak of (3 1 2) at 2θ=33.70 to 34.25° in a spectrum obtained by X-ray diffraction.
[3]
The GIS-type zeolite according to [1] or [2], having a potassium atom content of 3% by mass or more.
[4]
The GIS-type zeolite according to any one of [1] to [3], wherein, when heights of peaks at 2θ=12.55 to 12.90° and at 21.7 to 22.2° in a spectrum obtained by X-ray diffraction are defined as A and B, respectively, 1.37<A/B<2.80 is satisfied.

[5]

The GIS-type zeolite according to any one of [1] to [4], wherein the GIS-type zeolite is silica/alumina.

[6]

An adsorbing material including the GIS-type zeolite according to any one of [1] to [5].

[7]

A separation method including separating one or more selected from the group consisting of $CO_2$, $H_2O$, He, Ne, $Cl_2$, $NH_3$, and HCl from a mixture including two or more gases selected from the group consisting of $H_2$, $N_2$, CO, and hydrocarbon by use of the adsorbing material according to [6].

[8]

The separation method according to [7], wherein the gas separation is performed by a pressure swing-type adsorption-separation method, a temperature swing-type adsorption-separation method, or a pressure/temperature swing-type adsorption-separation method.

Advantageous Effect of Invention

The present invention can provide a GIS-type zeolite which can sufficiently adsorb carbon dioxide and which is also high in selectivity of adsorption of carbon dioxide relative to the amount of adsorption of methane.

DESCRIPTION OF EMBODIMENTS

Hereinafter, an embodiment for carrying out the present invention (hereinafter, referred to as "the present embodiment".) will be described in detail. The present invention is not limited to the following description, and can be variously modified and carried out within the gist thereof.

A GIS-type zeolite of the present embodiment is a GIS-type zeolite having a diffraction peak of (1 0 1) at a diffraction angle $2\theta=12.55$ to $12.90°$ in a spectrum obtained by X-ray diffraction. The GIS-type zeolite of the present embodiment is configured as described above and thus is suggested to be different in distortion of an 8-membered ring structure from a conventional GIS-type zeolite and to have a slightly distorted elliptical shape, and is considered to not only be able to sufficiently adsorb carbon dioxide, but also be high in selectivity of adsorption of carbon dioxide with respect to the amount of adsorption of methane, by virtue of such a structure.

In the present embodiment, the GIS-type zeolite is preferably silica/alumina from the viewpoint of allowing the selective adsorption ability of carbon dioxide to be more enhanced.

The "silica/alumina" here refers to a GIS-type zeolite including silica and alumina as main components of the GIS-type zeolite (80% by mass or more), in which the content of aluminum is 1% by mass or more, more preferably 3% by mass or more, further preferably 5% by mass or more, the content of phosphorus is 4% by mass or less, and the contents of Zr and Ti are 8% by mass or less.

From the same viewpoint as described above, the phosphorus atom content in the GIS-type zeolite of the present embodiment is more preferably 1.5% by mass or less, particularly preferably 0% by mass.

The aluminum and phosphorus atom contents can be measured by a method described in Examples below. In addition, the aluminum and phosphorus atom contents can be adjusted by, for example, adjusting the compositional ratio of a mixed-gel for use in synthesis of the GIS-type zeolite within a preferable range described below.

(X-Ray Diffraction Peak)

A general GIS-type zeolite exhibits respective diffraction peaks of (1 0 1) and (3 1 2) around $2\theta=12.45°$ and $33.36°$ in a spectrum obtained by X-ray diffraction, as described in ICDD (International Centre for Diffraction Data) (for example, 00-039-0219) or the like.

On the other hand, the GIS-type zeolite of the present embodiment exhibits a diffraction peak of (1 0 1) which is observed in the range of $2\theta=12.55°$ to $12.90°$ in a spectrum obtained by X-ray diffraction. The GIS-type zeolite of the present embodiment preferably exhibits a diffraction peak of (3 1 2) which is observed in the range of $33.70°$ to $34.25°$ in a spectrum obtained by X-ray diffraction.

A diffraction peak of (1 0 1) corresponds to diffraction reflecting a periodic structure of a dcc structure around an 8-membered ring structure of the GIS-type zeolite. A diffraction peak of (1 0 1) with respect to the GIS-type zeolite of the present embodiment is shifted to a higher angle, a periodic structure is considered to be shorter, and such a phenomenon is generally found, for example, in the case of a reduced lattice constant. It is supposed that a shorter periodic structure results in a decrease in pore size, to thereby make carbon dioxide less likely to be entered into a pore, resulting in a reduction in amount of adsorption. Meanwhile, the GIS-type zeolite of the present embodiment can be adjusted so as to be in the form of a crystal where a diffraction peak of (1 0 1) is observed in a proper range, resulting in an increase in amount of adsorption of carbon dioxide. The structure of an 8-membered ring of a typical GIS-type zeolite is distorted and has an elliptical shape where the length of the longer axis is 4.5 Å and the length of the shorter axis is 3.1 Å, and a carbon dioxide molecule having an average molecular size of 3.3 Å cannot easily penetrate into a pore. It is considered, however, that when a crystal is optimally synthesized and adjusted, distortion is relaxed and the shape of a pore approaches a circular shape to thereby facilitate penetration of carbon dioxide into such a pore, resulting in an increase in amount of adsorption. Such an optimized distortion-relaxed state corresponds to a state where a periodic structure of (1 0 1) is slightly shortened and X-ray diffraction peak is observed at $2\theta=12.55°$ to $12.90°$. The $2\theta$ value of a diffraction peak of (1 0 1) preferably satisfies $2\theta=12.58°$ to $12.85°$, more preferably $2\theta=12.60°$ to $12.80°$, from the same viewpoint as described above. Other diffraction peak is also considered to be observed at an optimal peak position. In this regard, a diffraction peak of (3 1 2), in addition to a diffraction peak of (1 0 1), can also be employed to determine whether or not an optimal structure is formed, from the viewpoint that such a peak is remarkably shifted and can be clearly discriminated without being overlapped with other peak. The $2\theta$ value of a diffraction peak of (3 1 2) is $33.70°$ to $34.25°$, more preferably 2θ=33.85° to 34.22°, further preferably 2θ=34.02° to 34.20°. A diffraction peak of (3 1 2) may also be present at any value other than the aforementioned 2θ value. Such other 2θ value is, for example, 2θ=21.22 to 22.17°, 22.18 to 22.38°, 28.34 to 28.74°, 28.86 to 29.26°, 31.30 to 31.70°, or 38.40 to 38.80°.

The method for forming an optimal distortion-relaxed state is not particularly limited, and examples thereof include a method for optimizing a cation included in a crystal structure. A preferable cation is K, Ca, Rb, or Cs, and a particularly preferable cation is K. Li is smaller in ion radius than Na, and a small crystal lattice is caused due to a reduction in volume of a cation in a pore by ion exchange with Li, thereby resulting in a tendency where, while each X-ray diffraction peak is also shifted to a higher angle, peaks of (1 0 1) and (3 1 2) are not optimal values, and a tendency where a sufficient amount of adsorption of carbon dioxide cannot be consequently ensured. Thus, it is also presumed that the shifting to a higher angle of such diffraction peaks are not based on simple expansion and/or decrease in lattice constant and/or diameter of 8-membered ring, but based on a fine change in structure, like a change in distortion.

Herein, the diffraction angle 2θ values of the diffraction peaks can be determined by a method described in Examples below, and both can be adjusted within the above ranges by methods for adjusting the compositional ratio of a mixed-gel, the aging period and conditions in hydrothermal synthesis (heating temperature and heating time) of a mixed-gel, optimization of a cation, and the like within preferable ranges described below.

The GIS-type zeolite of the present embodiment preferably satisfies 1.37<A/B<2.80 when heights of peaks at 2θ=12.55 to 12.90° and at 21.7 to 22.2° in a peak obtained by X-ray diffraction are defined as A and B, respectively. In an X-ray diffraction peak at 25° C. of the GIS-type zeolite of the present embodiment, peaks at 2θ=12.55 to 12.90° and 21.7 to 22.2° correspond to diffraction peaks (1 0 1) and (2 1 1), respectively. A diffraction peak of (1 0 1) corresponds to diffraction reflecting a periodic structure of an oxygen 8-membered ring of the GIS-type zeolite, and a diffraction peak of (2 1 1) corresponds to diffraction reflecting a finer structure thereof. It is indicated that, when the height of a diffraction peak of (1 0 1) is defined as A and the height of a diffraction peak of (2 1 1) is defined as B, and A/B is here high, a larger periodic structure, namely, a structure including an 8-membered ring structure is clear. It is known that a cation included in zeolite can be moved, and it is considered that there are no deficiencies in a large periodic structure including an 8-membered ring structure and such a structure is clearly formed to thereby result in an increase in the mobility of a cation and to allow the cation to move without interfering in penetration of carbon dioxide into a pore, thereby allowing the adsorption ability of carbon dioxide to be further exhibited. From this viewpoint, A/B is preferably more than 1.37, more preferably more than 1.40, further preferably 1.50 or more.

On the other hand, it is considered that a smaller value of B tends to cause the number of deficiencies in a fine structure to be increased, and it is considered that an adsorption site to which any molecule other than $CO_2$, such as $CH_4$ and $N_2$, can adsorb also tends to be increased accordingly. Thus, A/B is preferably less than a certain value from the viewpoint of a more enhancement in selective adsorption properties of $CO_2$. Specifically, the A/B is preferably less than 2.80, more preferably less than 2.78, further preferably 2.75 or less.

Herein, the A/B value can be determined by a method described in Examples below, and can be adjusted within the above ranges by methods for adjusting the compositional ratio of a mixed-gel, the aging period and conditions in hydrothermal synthesis (heating temperature and heating time) of a mixed-gel, optimization of a cation, and the like within preferable ranges described below.

In the present embodiment, the potassium atom content in the GIS-type zeolite is preferably 3% by mass or more, more preferably 3.3% by mass or more, further preferably 3.6% by mass or more, from the viewpoint that an elliptic structure with respect to an 8-membered ring of the GIS-type zeolite is deformed. On the other hand, the potassium atom content in the GIS-type zeolite is preferably 21% by mass or less, more preferably 18% by mass or less, further preferably 16% by mass or less, from the viewpoint of prevention of generation of impurities and deterioration in crystallinity of the GIS-type zeolite.

The potassium atom content can be determined by a method described in Examples below, and can be adjusted within the above range by a method for adjusting the compositional ratio of a mixed-gel within a preferable range described below.

(Synthesis Method)

A method for producing a GIS-type zeolite according to the present embodiment can include, for example, a step of preparing of a mixed gel containing a silica source including silicon, an aluminum source including aluminum, an alkali metal source including at least one selected from an alkali metal (M1) and an alkaline earth metal (M2), a phosphorus source including phosphorus, and water. Hereinafter, the mixed gel and each component included therein will be described.

[Mixed Gel]

The mixed gel in the present embodiment is a mixture including a silica source, an aluminum source, an alkali metal source and water as components and, if necessary, including a phosphorus source and an organic structure-directing agent.

The silica source refers to a component in the mixed gel, serving as a starting material of silicon included in a zeolite produced from the mixed gel, the aluminum source refers to a component in the mixed gel, serving as a starting material of aluminum included in a zeolite produced from the mixed gel, the alkali metal source refers to a component in the mixed gel, serving as starting material(s) of an alkali metal and/or an alkaline earth metal included in a zeolite produced from the mixed gel, and the phosphorus source refers to a component in the mixed gel, serving as a starting material of phosphorus included in a zeolite produced from the mixed gel.

[Silica Source]

The silica source is not particularly limited as long as it is one commonly used, and specific examples thereof include sodium silicate, amorphous silica, colloidal silica, wet method silica, dry method silica, silica gel, amorphous aluminosilicate gel, tetraethoxysilane (TEOS) and trimethylethoxysilane. These compounds may be used singly or in combinations of a plurality thereof. Here, amorphous aluminosilicate gel serves as the silica source and also serves as the aluminum source.

Among them, sodium silicate is preferable from the viewpoint that a zeolite high in the degree of crystallinity tends to be obtained.

[Aluminum Source]

The aluminum source is not particularly limited as long as it is one commonly used, and specific examples thereof include, sodium aluminate, aluminum sulfate, aluminum nitrate, aluminum acetate, aluminum hydroxide, aluminum oxide, aluminum chloride, aluminum alkoxide, metallic aluminum and amorphous aluminosilicate gel. These compounds may be used singly or in combinations of a plurality thereof.

Among them, sodium aluminate, aluminum sulfate, aluminum nitrate, aluminum acetate, aluminum hydroxide, aluminum chloride or aluminum alkoxide is preferable from the viewpoint that a zeolite high in the degree of crystallinity tends to be obtained. From the same viewpoint, sodium aluminate or aluminum hydroxide is more preferable, and sodium aluminate is further preferable.

[Alkali Metal Source]

The alkali type in the alkali metal source is not particularly limited, and any alkali metal and/or any alkaline earth metal compound can be used.

Examples of the alkali metal source include, but not limited to the following, hydroxide, hydrogen carbonate, carbonate, acetate, sulfate and nitrate of an alkali metal or an alkaline earth metal. These compounds may be used singly or in combinations of a plurality thereof.

The alkali metal and the alkaline earth metal for use in the alkali metal source can be usually Li, Na, K, Rb, Cs, Ca, Mg, Sr, Ba or the like. Li, Na, K, Rb, Cs or Ca is preferable and Na or K is more preferable, from the viewpoint of more facilitating crystal formation of the GIS-type backbone. The alkali metal and the alkaline earth metal for use in the alkali metal source may be used singly or in combinations of a plurality thereof.

Specific examples of the alkali metal source include, but not limited to the following, sodium hydroxide, sodium acetate, sodium sulfate, sodium nitrate, sodium carbonate, sodium hydrogen carbonate, potassium hydroxide, potassium acetate, potassium sulfate, potassium nitrate, potassium carbonate, potassium hydrogen carbonate, lithium hydroxide, lithium acetate, lithium sulfate, lithium nitrate, lithium carbonate, lithium hydrogen carbonate, rubidium hydroxide, rubidium acetate, rubidium sulfate, rubidium nitrate, rubidium carbonate, rubidium hydrogen carbonate, cesium hydroxide, cesium acetate, cesium sulfate, cesium nitrate, cesium carbonate, cesium hydrogen carbonate, calcium hydroxide, calcium acetate, calcium sulfate, calcium nitrate, calcium carbonate, calcium hydrogen carbonate, magnesium hydroxide, magnesium acetate, magnesium sulfate, magnesium nitrate, magnesium carbonate, magnesium hydrogen carbonate, strontium hydroxide, strontium acetate, strontium sulfate, strontium nitrate, strontium carbonate, strontium hydrogen carbonate, barium hydroxide, barium acetate, barium sulfate, barium nitrate, barium carbonate and barium hydrogen carbonate.

Among them, sodium hydroxide, potassium hydroxide, lithium hydroxide, rubidium hydroxide, cesium hydroxide, calcium hydroxide, magnesium hydroxide, strontium hydroxide or barium hydroxide is preferable, sodium hydroxide, potassium hydroxide, lithium hydroxide, rubidium hydroxide or cesium hydroxide is more preferable, and sodium hydroxide or potassium hydroxide is further preferable.

[Phosphorus Source]

The phosphorus source is not particularly limited as long as it is one commonly used, and specific examples thereof include an aqueous phosphoric acid solution, sodium phosphate, aluminum phosphate, potassium phosphate, lithium phosphate, calcium phosphate and barium phosphate. These compounds may be used singly or in combinations of a plurality thereof.

Among them, an aqueous phosphoric acid solution, sodium phosphate or aluminum phosphate is preferable from the viewpoint that a zeolite high in the degree of crystallinity tends to be obtained. From the same viewpoint, an aqueous phosphoric acid solution or sodium phosphate is more preferable and an aqueous phosphoric acid solution is further preferable.

[Organic Structure-Directing Agent]

The organic structure-directing agent in the case of zeolite production by hydrothermal synthesis of the mixed gel is a compound acting as promoting crystallization to a zeolite structure. In zeolite crystallization, the organic structure-directing agent can be, if necessary, used.

Any organic structure-directing agent may be adopted as the organic structure-directing agent without any limitation in terms of the type as long as it can form a desired GIS-type zeolite. The organic structure-directing agent may be used singly or in combinations of a plurality thereof.

Examples of the organic structure-directing agent which may be used herein include, but not limited to the following, amines, quaternary ammonium salts, alcohols, ethers, amides, alkyl ureas, alkyl thioureas, cyanoalkanes, and alicyclic heterocyclic compounds including nitrogen as a hetero atom can be used, and alkylamines are preferably used and isopropylamine is more preferably used.

Such salts may have an anion. Representative examples of such an anion include, but not limited to the following, a halogen ion such as $Cl^-$, $Br^-$ and $I^-$, a hydroxide ion, an acetate ion, a sulfate ion, a nitrate ion, a carbonate ion, and a hydrogen carbonate ion. Among them, a halogen ion or a hydroxide ion is preferable and a halogen ion is more preferable, from the viewpoint of more facilitating crystal formation of the GIS-type backbone.

[Compositional Ratio of Mixed-Gel]

The ratio between the silica source and the aluminum source in the mixed gel is represented as the molar ratio of the oxides of the corresponding elements, namely, $SiO_2/Al_2O_3$.

The ratio $SiO_2/Al_2O_3$ is not particularly limited as long as zeolite can be formed, and the ratio is preferably 4.0 or more and 70.0 or less, more preferably 4.4 or more and 65.0 or less, further preferably 5.5 or more and 55.0 or less, still further preferably 5.8 or more and 52.0 or less, furthermore preferably 6.0 or more and 50.0 or less, still furthermore preferably 6.5 or more and 40.0 or less because formation of a zeolite having a backbone different from the GIS-type backbone tends to be able to be suppressed.

The ratio between the aluminum source and the alkali metal source in the mixed gel is represented by the molar ratio of the sum of $M1_2O$ and $M2O$ to $Al_2O_3$, namely, $(M1_2O+M2O)/Al_2O_3$ (wherein M1 represents the alkali metal and M2 represents the alkaline earth metal). Herein, the ratio $(M1_2O+M2O)/Al_2O_3$ is further preferably 1.6 or more, still further preferably 1.7 or more, furthermore preferably 1.8 or more, still furthermore preferably 1.9 or more, from the viewpoint of more facilitating crystal formation of the GIS-type backbone.

The ratio $(M1_2O+M2O)/Al_2O_3$ is preferably 2.5 or more and 75.0 or less, furthermore preferably 3.2 or more and 58.0 or less, still furthermore preferably 3.4 or more and 55.5 or less, from the viewpoint that formation of a zeolite having a backbone different from the GIS-type backbone can be suppressed.

The ratio between the phosphorus source and the aluminum source in the mixed gel is represented as the molar ratio of the oxides of the corresponding elements, namely, $P_2O_5/Al_2O_3$.

The ratio $P_2O_5O_2/Al_2O_3$ is not particularly limited as long as zeolite can be formed, and the ratio is preferably less than 1.0, more preferably 0.6 or less, further preferably 0.4 or less, particularly preferably 0 because formation of a zeolite having a backbone different from the GIS-type backbone tends to be able to be suppressed.

When the organic structure-directing agent is included in the mixed gel, the ratio between the aluminum source and the organic structure-directing agent in the mixed gel is represented by the molar ratio of the organic structure-directing agent to $Al_2O_3$, namely, $R/Al_2O_3$ (wherein R represents the organic structure-directing agent). The ratio is preferably less than 9.5, more preferably 7.5 or less, further preferably 6.0 or less, from the viewpoint of more facilitating crystal formation of the GIS-type backbone and/or decreasing the synthesis period to allow economic efficiency in zeolite production to be excellent.

The ratio between the aluminum source and water in the mixed gel is represented by the molar ratio of water to $Al_2O_3$, namely, $H_2O/Al_2O_3$. The ratio is preferably 100 or more, more preferably 200 or more, from the viewpoint that the components in the mixed gel tend to be more uniformly dispersed. The ratio is further preferably 300 or more from the viewpoint that formation of a zeolite having a backbone different from the GIS-type backbone can be suppressed.

The ratio $H_2O/Al_2O_3$ is preferably 2800 or less, more preferably 1800 or less, from the viewpoint of decreasing the synthesis period to allow economic efficiency in zeolite production to be excellent. The ratio is further preferably 1300 or less from the viewpoint that formation of a zeolite having a backbone different from the GIS-type backbone can be suppressed.

As described above, the method for producing a GIS-type zeolite according to the present embodiment includes a step of preparing of a mixed gel containing: a silica source including silicon; an aluminum source including aluminum; an alkali metal source including at least one selected from an alkali metal (M1) and an alkaline earth metal (M2); a phosphorus source; and water, wherein, when the molar ratios of components in the mixed gel are calculated (the molar ratios are calculated in terms of oxides of corresponding elements with respect to the silicon, the aluminum, the alkali metal (M1), the alkaline earth metal (M2) and the phosphorus source), the molar ratios α, β, γ and δ represented by the following expressions (1), (2), (3) and (4) preferably satisfy $4.5 \leq α \leq 65.0$, $2.5 \leq β \leq 75.0$, $0 \leq γ < 1.0$ and $100 \leq δ \leq 2800$. The GIS-type zeolite according to the present embodiment is particularly preferably one obtained by the method for producing a GIS-type zeolite according to the present embodiment.

$$α = SiO_2/Al_2O_3 \quad (1)$$

$$β = (M1_2O + M2O)/Al_2O_3 \quad (2)$$

$$γ = P_2O_5/Al_2O_3 \quad (3)$$

$$δ = H_2O/Al_2O_3 \quad (4)$$

Furthermore, in the method for producing a GIS-type zeolite according to the present embodiment, preferably, the molar ratios α, β, γ and δ satisfy the above ranges, and when the mixed gel further includes an organic structure-directing agent R, the molar ratio ε represented by the following expression (5) preferably satisfies $ε < 9.5$.

$$ε = R/Al_2O_3 \quad (5)$$

Although a seed crystal is not necessarily needed to be present in the mixed gel, a GIS-type zeolite produced in advance can also be added as a seed crystal to the mixed gel, to provide the GIS-type zeolite of the present embodiment.

[Step of Preparing Mixed Gel]

The step of preparing a mixed gel is not particularly limited, and examples thereof may include a mixing step of mixing a silica source, an aluminum source, an alkali metal source, water, and, if necessary, an organic structure-directing agent at one time or at multiple stages, and an aging step of the mixture obtained in the mixing step.

The mixing step can mix components including the silica source, the aluminum source, the alkali metal source, water, and, if necessary, the organic structure-directing agent at one time or at multiple stages.

The order in mixing at multiple stages is not limited, and may be appropriately selected depending on conditions used. The mixing at multiple stages may be performed either with stirring or without stirring.

In stirring, a stirring method commonly used is adopted without any particular limitation, and specific examples thereof include methods using blade stirring, vibration stirring, oscillation stirring, and centrifugation stirring, and the like.

The rotational speed in stirring is not particularly limited as long as it is a stirring speed commonly used, and is, for example, 1 rpm or more and less than 2000 rpm.

The temperature in the mixing step is not particularly limited as long as it is a temperature commonly used, and is, for example, −20° C. or more and less than 80° C.

The period for the mixing step is not particularly limited and can be appropriately selected depending on the temperature in the mixing step, and is, for example, more than 0 minutes and 1000 hours or less.

The aging step may be performed with either standing or stirring.

In stirring in the aging step, a stirring method commonly used is adopted without any particular limitation, and specific examples include methods using blade stirring, vibration stirring, oscillation stirring, and centrifugation stirring.

The rotational speed in stirring is not particularly limited as long as it is a stirring speed commonly used, and is, for example, 1 rpm or more and less than 2000 rpm. The temperature in the aging step is not particularly limited as long as it is a temperature commonly used, and is, for example, −20° C. or more and less than 80° C.

The period for the aging step is not particularly limited, can be appropriately selected depending on the temperature in the aging step, and is, for example, more than 0 minutes and 1000 hours or less.

It is considered in zeolite production that dissolution of starting materials and production and re-dissolution of a zeolite precursor occur in the mixing step and the aging step of starting materials. In order to form a large periodic structure including an 8-membered ring without the occurrence of defects and the like, it is preferable not to allow formation of a zeolite precursor to excessively progress. When formation of a zeolite precursor excessively progresses, it is preferable not to excessively age such a precursor because generation of an ANA-type zeolite having a more stable structure tends to be increased. On the other hand, starting materials are preferably sufficiently mixed to provide a uniform starting material gel. The total period for the mixing step and the aging step combined may be appropriately adjusted based on the composition of starting materials, and the like in order to obtain a zeolite having a proper structure, and is not particularly limited. The period is typically preferably 1 minute or more and less than 24 hours, more preferably 3 minutes or more and less than 23 hours, further preferably 10 minutes or more and 18 hours or less, still further preferably 15 minutes or more and 15 hours or less, furthermore preferably 31 minutes or more and 6 hours or less.

[Hydrothermal Synthesis Step]

The method for producing a GIS-type zeolite according to the present embodiment preferably further includes a hydrothermal synthesis step where the hydrothermal synthesis temperature is 80° C. to 145° C., and the hydrothermal synthesis temperature is more preferably 80° C. to 140° C. That is, the mixed gel obtained in the preparation step is preferably subjected to hydrothermal synthesis with being kept at a predetermined temperature for a predetermined period with stirring or standing.

The temperature in the hydrothermal synthesis is not particularly limited as long as it is a temperature commonly used, and it is preferably 80° C. or more, from the viewpoint of decreasing the synthesis period to allow economic efficiency in zeolite production to be excellent. The temperature is more preferably 90° C. or more, further preferably 100° C. or more, from the viewpoint that formation of a zeolite having a backbone different from the GIS-type backbone can be suppressed.

The temperature is more preferably 145° C. or less, further preferably 140° C. or less, further preferably 135° C. or less, from the viewpoint that formation of a zeolite having a backbone different from the GIS-type backbone can be suppressed.

The temperature in the hydrothermal synthesis may be constant or may be changed stepwisely.

The period for the hydrothermal synthesis is not particularly limited as long as it is a period commonly used, and can be appropriately selected depending on the temperature in the hydrothermal synthesis.

The period for the hydrothermal synthesis is preferably 3 hours or more, more preferably 10 hours or more, from the viewpoint that the GIS backbone is formed. The period is further preferably 24 hours or more from the viewpoint that a GIS-type zeolite high in crystallinity is obtained.

The period for the hydrothermal synthesis is preferably 30 days or less, more preferably 20 days or less, further preferably 10 days or less, from the viewpoint of allowing the economic efficiency in zeolite production to be excellent.

The container to which the mixed gel is loaded in the hydrothermal synthesis step is not particularly limited as long as it is a container commonly used, and when the pressure in the container is increased at a predetermined temperature or is gas pressure not inhibiting crystallization, the mixed gel is preferably loaded in a pressure-resistant container and subjected to the hydrothermal synthesis.

The pressure-resistant container is not particularly limited, and a pressure-resistant container having any of various shapes such as spherical, longitudinally elongated, and horizontally elongated shapes can be used.

When the mixed gel in the pressure-resistant container is stirred, the pressure-resistant container is rotated vertically and/or laterally, preferably rotated vertically.

When the pressure-resistant container is rotated vertically, the rotational speed is not particularly limited as long as it is within a range commonly used, and it is preferably 1 to 50 rpm, more preferably 10 to 40 rpm.

In the hydrothermal synthesis step, examples of preferable stirring of the mixed gel include a method including using a pressure-resistant container having a longitudinally elongated shape and vertically rotating it.

[Separation/Drying Step]

After the hydrothermal synthesis step, the solid as the product and the liquid including water are separated, and the separation method is not particularly limited as long as it is a common method. Filtration, decantation, a spray-drying method (rotary atomization, nozzle atomization, ultrasonic atomization or the like), a drying method using a rotary evaporator, a vacuum drying method, a freeze-drying method, a natural drying method, or the like can be used, and separation can be usually made by filtration or decantation.

The resultant from separation may be used as it is, or may be washed with water or a predetermined solvent. The resultant from separation can be, if necessary, dried.

The temperature at which the resultant from separation is dried is not particularly limited as long as it is a common drying temperature, and it is usually from room temperature to 150° C. or less.

The atmosphere during drying is not particularly limited as long as it is an atmosphere commonly used, and an air atmosphere, or an atmosphere to which an inert gas such as nitrogen or argon, or oxygen is added is usually used.

[Calcining Step]

A GIS-type zeolite, if necessary, calcined can be used. The calcining temperature is not particularly limited as long as it is a temperature commonly used, and it is preferably 300° C. or more, more preferably 350° C. or more, from the viewpoint that, when the organic structure-directing agent is desired to be removed, the proportion thereof remaining can be decreased. The temperature is further preferably 400° C. or more from the viewpoint that the calcining period is decreased to allow the economic efficiency in zeolite production to be excellent.

The temperature is preferably less than 550° C., more preferably 530° C. or less, further preferably 500° C. or less because crystallinity of zeolite tends to be retained.

The calcining period is not particularly limited as long as it is a period where the organic structure-directing agent is sufficiently removed, and it can be appropriately selected depending on the calcining temperature and is preferably 0.5 hours or more, more preferably 1 hour or more, further preferably 3 hours or more because the proportion of the remaining organic structure-directing agent tends to be able to be decreased.

The calcining period is preferably 20 days or less, more preferably 10 days or less, further preferably 7 days or less because crystallinity of zeolite tends to be retained.

The calcining atmosphere is not particularly limited as long as it is an atmosphere commonly used, and an air atmosphere, or an atmosphere to which an inert gas such as nitrogen or argon, or oxygen is added is usually used.

[Cation Exchange]

The GIS-type zeolite can be, if necessary, subjected to cation exchange to a desired cation type. In such cation exchange, without limitation to the following, for example, nitrate such as $NH_4NO_3$, $LiNO_3$, $NaNO_3$, $KNO_3$, $RbNO_3$, $CsNO_3$, $Be(NO_3)_2$, $Ca(NO_3)_2$, $Mg(NO_3)_2$, $Sr(NO_3)_2$ or $Ba(NO_3)_2$, or a salt where a nitrate ion included in the nitrate is changed to a halide ion, a sulfate ion, a carbonate ion, a hydrogen carbonate ion, an acetate ion, a phosphate ion or a hydrogen phosphate ion, or an acid such as nitric acid or hydrochloric acid can be used. Such cation exchange can be made by use of hydroxide, preferably an aqueous alkali solution, and the concentration of such an aqueous alkali solution is preferably 0.05 to 0.15 N (more preferably 0.1 N).

The cation exchange temperature is not particularly limited as long as it is a common cation exchange temperature, and it is usually from room temperature to 100° C. or less.

In separation of zeolite after such cation exchange, the separation method is not particularly limited as long as it is a common method. Filtration, decantation, a spray-drying method (rotary atomization, nozzle atomization, ultrasonic atomization or the like), a drying method using a rotary evaporator, a vacuum drying method, a freeze-drying method, a natural drying method, or the like can be used, and separation can be usually made by filtration or decantation.

The resultant from separation may be used as it is, or may be washed with water or a predetermined solvent. The resultant from separation can be, if necessary, dried.

The temperature at which the resultant from separation is dried is not particularly limited as long as it is a common drying temperature, and it is usually from room temperature to 150° C. or less.

The atmosphere during drying is not particularly limited as long as it is an atmosphere commonly used, and an air atmosphere, or an atmosphere to which an inert gas such as nitrogen or argon, or oxygen is added is usually used.

Furthermore, an ammonium-type zeolite can also be calcined and thus converted to a proton-type zeolite.

A preferable cation is K, Ca, Rb, or Cs and a particularly preferable cation is K, from the viewpoint that a structure where an X-ray diffraction peak is at an optimal position is formed and the amount of adsorption of carbon dioxide is increased.

The GIS-type zeolite of the present embodiment is not particularly limited in the application thereof, and can be used for, for example, separating agents or separation membranes for various gases and liquids, electrolyte membranes for fuel cells and the like, fillers of various resin molded articles, membrane reactors, catalysts for hydrocracking, alkylation and the like, catalyst carriers for carrying metals, metal oxides, and the like, adsorbing materials, desiccants, detergent aids, ion exchangers, waste water treatment agents, fertilizers, food additives, cosmetic additives, and the like.

Among the above, the GIS-type zeolite of the present embodiment can be suitably used as an adsorbing material. That is, an adsorbing material of the present embodiment includes the GIS-type zeolite of the present embodiment. The adsorbing material of the present embodiment is thus configured, and thus can sufficiently adsorb carbon dioxide and is also high in selectivity of adsorption of carbon dioxide relative to the amount of adsorption of methane. Therefore, the adsorbing material can be particularly preferably used for the purpose of, for example, selective removal of carbon dioxide from natural gas.

Figure 4:
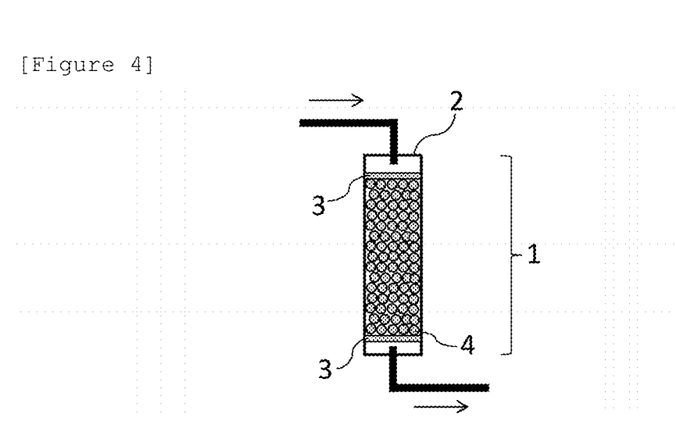
FIG. 4 illustrates a view exemplifying an adsorbing material according to one embodiment of the present invention.

The adsorbing material of the present embodiment is not particularly limited in terms of the configuration thereof as long as it includes the GIS-type zeolite of the present embodiment, and examples of a typical configuration include an example illustrated in FIG. 4. An adsorbing material 1 of the present embodiment, illustrated in FIG. 4, includes a filter 3 disposed at each of two positions closer to the inlet and the outlet in a container 2, and a plurality of zeolite particles 4 (the GIS-type zeolite of the present embodiment) disposed between such two filters 3. For example, a filter formed from quartz can be used for the filter 3. For example, when the adsorbing material 1 is used for removal of carbon dioxide from natural gas, the natural gas can be introduced through an upper line and impurities can be removed therefrom by the filter 3, thereafter carbon dioxide is selectively adsorbed and removed by the zeolite particles 4, and a methane-rich gas can be taken out through a lower line. Herein, an object to be subjected to the adsorbing material is not limited to natural gas, and the inner structure of the adsorbing material is also not limited to the example illustrated in FIG. 4.

(Separation Method)

A separation method of the present embodiment separates one or more selected from the group consisting of $CO_2$, $H_2O$, He, Ne, $Cl_2$, $NH_3$, and HCl from a mixture including two or more gases selected from the group consisting of $H_2$, $N_2$, CO, and hydrocarbon by use of an adsorbing material including the GIS-type zeolite of the present embodiment. In the present embodiment, one or more selected from the group consisting of $CO_2$ and $H_2O$ are preferably separated from one or more gases selected from the group consisting of $N_2$, CO, and hydrocarbon. Herein, the hydrocarbon is not particularly limited, and examples thereof include methane, ethane, ethylene, propane, propylene, 1-butene, 2-butene, 2-methylpropene, dimethyl ether, and acetylene.

The GIS-type zeolite of the present embodiment is high in volume of adsorption of $CO_2$, and physical adsorption through no chemical bond is observed. Such a separation method using the GIS-type zeolite of the present embodiment is not particularly limited, and is preferably a method low in energy in reproduction of an adsorbing material and excellent in economic performance. A specific example of such a method here used is, but not particularly limited, preferably any of a pressure swing-type adsorption-separation method, a temperature swing-type adsorption-separation method, or a pressure/temperature swing-type adsorption-separation method. A pressure swing-type adsorption-separation method (PSA: Pressure Swing Adsorption) is a method where gas separation is performed by decreasing the pressure in gas desorption so that the pressure is lower than that in gas adsorption and utilizing the difference between the amount of adsorption at a high pressure and the amount of adsorption at a low pressure. A temperature swing-type adsorption-separation method (TSA: Thermal Swing Adsorption) is a method where gas separation is performed by increasing the temperature in gas desorption so that the temperature is higher than that in gas adsorption and utilizing the difference between the amount of adsorption at a low temperature and the amount of adsorption at a high temperature. A combined method of such methods is a pressure/temperature swing-type adsorption desorption method (PTSA: Pressure and Thermal Swing Adsorption). Such methods can be performed in various known conditions.

EXAMPLES

Hereinafter, the present embodiment will be described with reference to Examples and the like in more detail, but such Examples are illustrative, and the present embodiment is not intended to be limited to the following Examples. The following Examples can be variously modified and carried out as the present embodiment by those skilled in the art, and such modifications are encompassed within the scope of the present invention as long as these can satisfy predetermined requirements of the present embodiment.

[Crystal Structure Analysis]

Crystal structure analysis was performed according to the following procedure.

(1) A dried product obtained in each of Examples and Comparative Examples was used as a sample, and pulverized by an agate mortar. A mixed product was used as a structure analysis sample, the product being obtained by further adding 10% by mass of crystalline silicon (produced by Rare Metallic Co., Ltd.) and mixing the resultant by an agate mortar until a homogeneous system was obtained.

(2) The sample in (1) above was uniformly secured on a non-reflective sample plate for powder, and crystal structure analysis was performed in the following conditions.
X-ray diffraction (XRD): powder X-ray diffraction apparatus "RINT2500 Model" (trade name) manufactured by Rigaku Corporation
X-ray source: Cu tube (40 kV, 200 mA)
Measurement temperature: 25° C.
Measurement range: 5 to 60° (0.02°/step)
Measurement speed: 0.2°/min
Slit width (scattering, diffusion, light reception): 1°, 1°, 0.15 mm
(3) The resulting X-ray diffraction spectrum was subjected to correction of displacement of 2θ by use of a diffraction peak of crystalline silicon and thereafter data analysis using an XRD data analysis software "PDXL2" (software name, manufactured by Rigaku Corporation) with the value set in the analysis software, "α-cut value", being 3.00, thereby determining the peak 2θ value.

[Gas Adsorption Isotherm Measurement]

Gas adsorption isotherm measurement was performed according to the following procedure.
(1) A calcined product obtained in each of Examples and Comparative Examples was used as a sample, and 0.2 g thereof was placed in a 12-mm cell (manufactured by Micromeritics Instrument Corporation).
(2) The sample placed in the cell of (1) above was mounted in a gas adsorption measuring apparatus "3-Flex" (trade name) manufactured by Micromeritics Instrument Corporation, and subjected to a degassing treatment with heating under vacuum at 250° C. and 0.001 mmHg or less for 12 hours.
(3) The sample placed in the cell after the treatment in (2) above was placed in constant-temperature circulating water at 25° C., and, after the sample temperature reached 25±0.2° C., measurement with liquefied carbon dioxide gas (produced by Sumitomo Seika Chemicals Co., Ltd., purity: 99.9% by mass or more), methane gas (produced by Sumitomo Seika Chemicals Co., Ltd., purity: 99.0% by mass or more) or nitrogen gas (produced by Taiyo Nippon Sanso Corporation, purity: 99.9995% by mass) was conducted with the absolute pressure being 0.25 up to 760 mmHg. Here, the pressure was measured over time during the measurement, and it was determined that the amount of saturation adsorption was achieved when the pressure variation reached 0.001%/10 sec or less.

[Adsorption Selection Rate]

In gas adsorption isotherm measurement, when the amount of saturation adsorption of carbon dioxide into the GIS-type zeolite, measured when the GIS-type zeolite and carbon dioxide were placed in a system at 25° C. and 760 mmHg, was defined as a ($cm^3/g$), the amount of saturation adsorption of methane into the GIS-type zeolite, measured when the GIS-type zeolite and methane were placed in a system at 25° C. and 760 mmHg, was defined as b ($cm^3/g$), and the amount of saturation adsorption of nitrogen into the GIS-type zeolite, measured when the GIS-type zeolite and nitrogen were placed in a system at 25° C. and 760 mmHg, was defined as c ($cm^3/g$), the value (a/b) or (a/c) obtained by dividing a by b or c was calculated as the adsorption selection rate.

[Measurement of Alkali Metal, Alkaline Earth Metal, Aluminum and Phosphorus Concentrations]

The GIS-type zeolite was thermally dissolved in an aqueous sodium hydroxide solution or aqua regia, and appropriately diluted to provide a liquid, and the liquid was used to measure the alkali metal, alkaline earth, aluminum and phosphorus concentrations in the zeolite by ICP-emission spectrochemical analysis (SPS3520UV-DD: apparatus name, manufactured by Seiko Instruments Inc.).

Example 1

259.10 g of water, 0.98 g of sodium hydroxide (NaOH, produced by Wako Pure Chemical Industries, Ltd.), 20.50 g of sodium aluminate ($NaAlO_2$, produced by Wako Pure Chemical Industries, Ltd.) and 310.4 g of liquid glass No. 3 (produced by Kishida Chemical Co., Ltd.) were mixed, and stirred for 45 minutes, thereby preparing a mixed gel. The composition of the mixed gel was as follows: $\alpha=SiO_2/Al_2O_3=12.0$, $\beta=Na_2O/Al_2O_3=3.0$, $\gamma=P_2O_5/Al_2O_3=0.0$, $\delta=H_2O/Al_2O_3=200$ and $\epsilon=R/Al_2O_3=0.0$. The mixed gel was loaded to a 1000-mL stainless autoclave with a fluororesin inner cylinder placed, and was subjected to hydrothermal synthesis at 130° C. for 5 days without stirring, a product was subjected to filtration and dried at 120° C., and thereafter a powdered zeolite was obtained.

1 g of the resulting zeolite was placed in 500 mL of an aqueous 0.1 N potassium nitrate solution, and stirred at 60° C. and 400 rpm for 3 hours. A product was subjected to filtration and dried at 120° C., and thereafter a powdered zeolite where the cation was partially exchanged with potassium was obtained.

Figure 1:
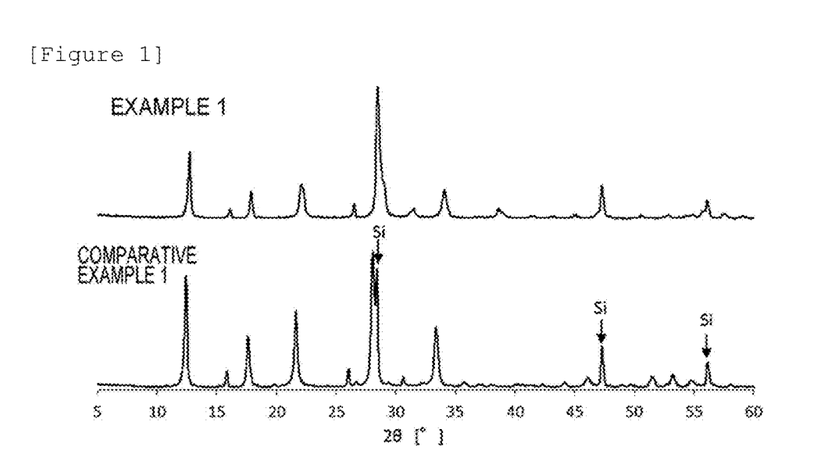
FIG. 1 illustrates an X-ray diffraction (XRD) diagram obtained by subjecting a mixture of crystalline silicon with each GIS-type zeolite obtained in Example 1 and Comparative Example 1, to measurement.
Figure 2:
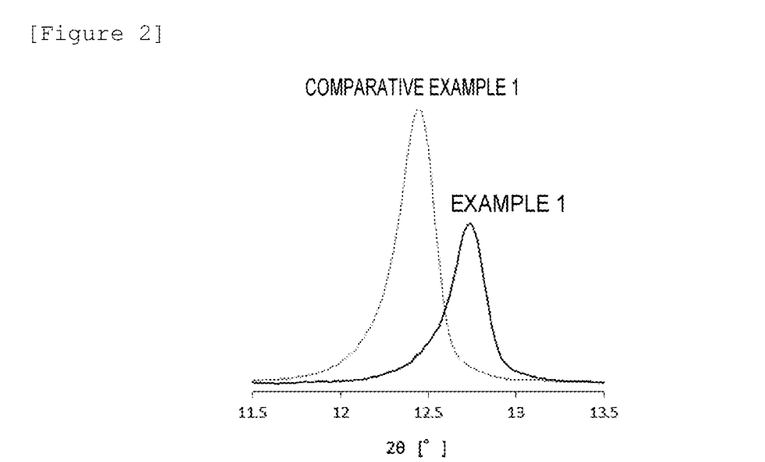
FIG. 2 illustrates an enlarged diagram in the vicinity of 12.70° in the X-ray diffraction (XRD) of each GIS-type zeolite obtained in Example 1 and Comparative Example 1.

An XRD spectrum of the resulting zeolite is illustrated in FIG. 1. It was confirmed from the spectrum that the resulting zeolite was a GIS-type zeolite. Furthermore, there were not observed any peaks derived from other zeolite, amorphous silica/alumina and the like, and therefore the resulting zeolite was evaluated to be a high-purity GIS-type zeolite. A diffraction peak of (1 0 1) was exhibited at 12.74° and a diffraction peak of (3 1 2) was exhibited at 34.10°. When the heights of a diffraction peak of (1 0 1) (2θ=12.55 to 12.90°) and a diffraction peak of (2 1 1) (2θ=21.7 to 22.2°) were defined as A and B (also hereinafter, similarly abbreviated.), respectively, A/B was 1.90.

The adsorption isotherms of $CO_2$, $CH_4$ and $N_2$ into the resulting GIS-type zeolite were measured, and thus the respective amounts of adsorption at 25° C. and 760 mmHg were as follows: $CO_2$: 64.2 $cm^3/g$, $CH_4$: 0.9 $cm^3/g$, and $N_2$: 0.8 $cm^3/g$; and the adsorption selection rate (a/b) was 71.3 and the adsorption selection rate (a/c) was 80.3. The alkali metal, alkaline earth, aluminum and phosphorus concentrations were measured by ICP-AES, and as a result, the aluminum concentration was 9.8% by mass, the potassium concentration was 12.2% by mass, the sodium concentration was 3.8% by mass, and no phosphorus was detected. Herein, silica and alumina were evaluated to be main components of the GIS-type zeolite (80% by mass or more). In other words, the GIS-type zeolite was identified to be silica/alumina.

Example 2

A zeolite was synthesized in the same manner as in Example 1 except that 258.2 g of water, 3.32 g of sodium hydroxide, 11.2 g of potassium hydroxide, 10.67 g of sodium aluminate and 165.5 g of liquid glass No. 3 were mixed and stirred for 1 hour. The composition of the mixed gel was as follows: $\alpha=SiO_2/Al_2O_3=12.0$, $\beta=Na_2O/Al_2O_3=3.0$, $\gamma=P_2O_5/Al_2O_3=0.0$, $\delta=H_2O/Al_2O_3=200$ and $\epsilon=R/Al_2O_3=0.0$.

From an XRD pattern of the resulting GIS-type zeolite, a diffraction peak of (1 0 1) was exhibited at 12.62° and a diffraction peak of (3 1 2) was exhibited at 34.02°. A/B was 1.80.

The adsorption isotherms of $CO_2$ and $CH_4$ into the resulting GIS-type zeolite were measured, and thus the respective amounts of adsorption at 25° C. and 760 mmHg were as follows: $CO_2$: 32.2 cm³/g, $CH_4$: 0.2 cm³/g, and $N_2$: 0.3 cm³/g; and the adsorption selection rate (a/b) was 161 and the adsorption selection rate (a/c) was 107.3. The aluminum concentration was 9.2% by mass, the potassium concentration was 3.8% by mass, the sodium concentration was 11.6% by mass, and no phosphorus was detected. Herein, silica and alumina were evaluated to be main components of the GIS-type zeolite (80% by mass or more). In other words, the GIS-type zeolite was identified to be silica/alumina.

Example 3

329.50 g of water, 1.76 g of sodium hydroxide, 3.28 g of sodium aluminate, and 49.7 g of liquid glass No. 3 were mixed, and stirred for 6 hours, thereby preparing a mixed-gel. The composition of the mixed-gel was as follows: $\alpha=SiO_2/Al_2O_3=12.0$, $\beta=Na_2O/Al_2O_3=4.0$, $\gamma=P_2O_5/Al_2O_3=0.0$, $\delta=H_2O/Al_2O_3=1000$, and $\epsilon=R/Al_2O_3=0.0$. The mixed-gel was loaded to a 1000-mL stainless autoclave with a fluororesin inner cylinder placed, and was subjected to hydrothermal synthesis at 135° C. for 4 days without stirring, a product was subjected to filtration and dried at 120° C., and thereafter a powdered zeolite was obtained.

1 g of the resulting zeolite was placed in 500 mL of an aqueous 0.1 N potassium hydroxide solution, and stirred at 40° C. and 400 rpm for 3 hours. A product was subjected to filtration and dried at 120° C., and thereafter a powdered zeolite where the cation was partially exchanged with potassium was obtained.

Figure 3:
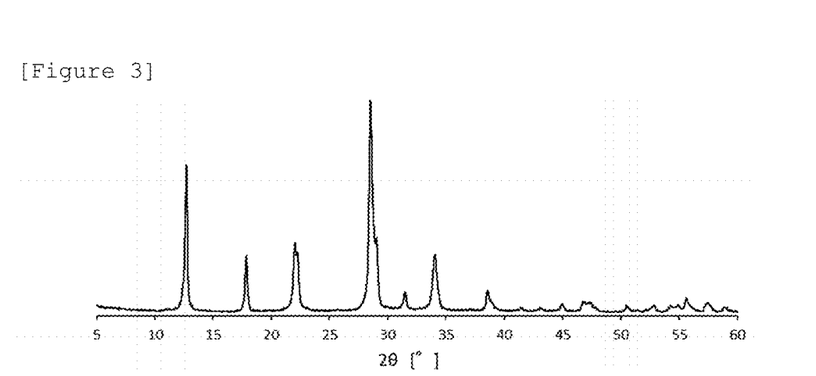
FIG. 3 illustrates an X-ray diffraction (XRD) diagram of a GIS-type zeolite obtained in Example 3.

An XRD spectrum of the resulting zeolite is illustrated in FIG. 3. From an XRD pattern of the resulting GIS-type zeolite, a diffraction peak of (1 0 1) was exhibited at 12.78° and a diffraction peak of (3 1 2) was exhibited at 34.18°. A/B was 2.1.

The adsorption isotherms of $CO_2$ and $CH_4$ into the resulting GIS-type zeolite were measured, and thus the respective amounts of adsorption at 25° C. and 760 mmHg were as follows: $CO_2$: 67.5 cm³/g, $CH_4$: 0.5 cm³/g, and $N_2$: 0.6 cm³/g; and the adsorption selection rate (a/b) was 135.0 and the adsorption selection rate (a/c) was 112.5. The alkali metal, alkaline earth, aluminum and phosphorus concentrations were measured by ICP-AES, and as a result, the aluminum concentration was 9.7% by mass, the potassium concentration was 12.4% by mass, the sodium concentration was 2.3% by mass, and no phosphorus was detected. Herein, silica and alumina were evaluated to be main components of the GIS-type zeolite (80% by mass or more). In other words, the GIS-type zeolite was identified to be silica/alumina.

Comparative Example 1

277.00 g of water, 18.3 g of sodium hydroxide, 3.28 g of sodium aluminate and 41.4 g of liquid glass No. 3 were mixed, and stirred under a $N_2$ atmosphere at 1800 rpm for 24 hours, thereby preparing a mixed gel. The composition of the mixed gel was as follows: $\alpha=SiO_2/Al_2O_3=10.0$, $\beta=Na_2O/Al_2O_3=14$, $\gamma=P_2O_5/Al_2O_3=0$, $\delta=H_2O/Al_2O_3=840$ and $\epsilon=R/Al_2O_3=0$. The mixed gel was subjected to hydrothermal synthesis at 100° C. for 24 hours with stirring at 1000 rpm, a product was subjected to filtration and dried at 120° C., and thereafter a powdered zeolite was obtained.

From an XRD pattern of the resulting GIS-type zeolite, a diffraction peak of (1 0 1) was exhibited at 12.44° and a diffraction peak of (3 1 2) was exhibited at 33.44°. The positions of such diffraction peaks did not satisfy any desired ranges, and thus A/B could not be calculated.

The adsorption isotherms of $CO_2$ and $CH_4$ into the resulting GIS-type zeolite were measured, and thus the respective amounts of adsorption at 25° C. and 760 mmHg were as follows: $CO_2$: 0.67 cm³/g, $CH_4$: 0.0 cm³/g, and $N_2$: 0.1 cm³/g; and the adsorption selection rate (a/b) was $\infty$ and the adsorption selection rate (a/c) was 6.7. The sodium concentration was 10.7% by mass, aluminum concentration was 7.8% by mass, and no phosphorus was detected.

Comparative Example 2

196.48 g of water, 41.28 g of aluminum isopropoxide (produced by Sigma-Aldrich), 118.22 g of isopropylamine (produced by Wako Pure Chemical Industries, Ltd.) as an organic structure-directing agent, 21.0 g of colloidal silica (Ludox AS-40, produced by W. R. Grace & Co.-Conn.) and 46.1 g of an aqueous 85% by mass phosphoric acid solution were mixed, and stirred for 1 hour, thereby preparing a mixed gel. The composition of the mixed gel was as follows: $\alpha=SiO_2/Al_2O_3=1.39$, $\beta=Na_2O/Al_2O_3=0$, $\gamma=P_2O_5/Al_2O_3=1.98$, $\delta=H_2O/Al_2O_3=118.7$ and $\epsilon=R/Al_2O_3=19.59$. The mixed gel was subjected to hydrothermal synthesis at 160° C. for 120 hours without stirring, and a product was subjected to filtration and dried at 120° C., thereafter heated to 325° C. at a rate of 20° C./min under a helium gas atmosphere for removal of the structure-directing agent, and thereafter calcined at 325° C. for 10 minutes, thereby providing a powdered zeolite.

From an XRD pattern of the resulting GIS-type zeolite, a diffraction peak of (1 0 1) was exhibited at 12.32° and a diffraction peak of (3 1 2) was exhibited at 33.32°. The positions of such diffraction peaks did not satisfy any desired ranges, and thus A/B could not be calculated. Neither an alkali metal, nor an alkaline earth metal was detected, and the aluminum concentration was 10.4% by mass and the phosphorus concentration was 14.2% by mass.

The adsorption isotherms of $CO_2$ and $CH_4$ into the resulting GIS-type zeolite were measured, and thus the respective amounts of adsorption at 25° C. and 760 mmHg were as follows: $CO_2$: 23.5 cm³/g, $CH_4$: 2.2 cm³/g, and $N_2$: 3.2 cm³/g; and the adsorption selection rate (a/b) was 10.7 and the adsorption selection rate (a/c) was 7.3.

Comparative Example 3

832.0 g of water, 4.39 g of sodium hydroxide, 8.20 g of sodium aluminate and 124.1 g of liquid glass No. 3 were mixed, and stirred under a $N_2$ atmosphere at 1800 rpm for 36 hours, thereby preparing a mixed gel. The composition of the mixed gel was as follows: $\alpha=SiO_2/Al_2O_3=12.0$, $\beta=Na_2O/Al_2O_3=4.0$, $\gamma=P_2O_5/Al_2O_3=0.0$, $\delta=H_2O/Al_2O_3=1009$ and $\epsilon=R/Al_2O_3=0.0$. The mixed gel was subjected to hydrothermal synthesis at 130° C. for 4 days without stirring, a product was subjected to filtration and dried at 120° C., and thereafter a powdered zeolite was obtained.

From an XRD pattern of the resulting GIS-type zeolite, a diffraction peak of (1 0 1) was exhibited at 12.45° and a diffraction peak of (3 1 2) was exhibited at 33.38°. The positions of such diffraction peaks did not satisfy any desired ranges, and thus A/B could not be calculated.

The adsorption isotherms of $CO_2$ and $CH_4$ into the resulting GIS-type zeolite were measured, and thus the respective amounts of adsorption at 25° C. and 760 mmHg were as follows: $CO_2$: 3.40 cm³/g, $CH_4$: 0.0 cm³/g, and $N_2$: 0.2 cm³/g; and the adsorption selection rate (a/b) was ∝ and the adsorption selection rate (a/c) was 17.0. The sodium concentration was 11.4% by mass, the aluminum concentration was 11.8% by mass, and no phosphorus was detected.

Comparative Example 4

To a liquid where 18 g of sodium metasilicate pentahydrate ($Na_2O_3Si/5H_2O$, produced by Sigma-Aldrich) and 210.0 g of water were mixed was added 127.1 g of triethanolamine ($C_6H_{25}NO_3$, produced by Carl Roth GmbH+Co. KG), and stirred at 600 rpm for 30 minutes. To the liquid was added a liquid where 2.34 g of sodium hydroxide and 148.0 g of water were mixed, and stirred at room temperature and 600 rpm for 30 minutes, thereby providing a mixed liquid containing no Al. The composition of the mixed liquid was as follows: $\alpha = SiO_2/Al_2O_3 = \infty$, $\beta = Na_2O/Al_2O_3 = \infty$, $\gamma = P_2O_5/Al_2O_3 = \infty$, $\delta = H_2O/Al_2O_3 = \infty$ and $\varepsilon = R/Al_2O_3 = \infty$. To a 1000-mL stainless autoclave with a fluororesin inner cylinder placed was loaded 1.134 g of an aluminum powder (Al, produced by Wako Pure Chemical Industries, Ltd.), the mixed liquid was placed therein and subjected to hydrothermal synthesis at 95° C. for 5 days for no aging period without stirring, a product was subjected to filtration and dried at 120° C., and thereafter a powdered zeolite was obtained.

From an XRD pattern of the resulting GIS-type zeolite, a diffraction peak of (1 0 1) was exhibited at 12.45° and a diffraction peak of (3 1 2) was exhibited at 33.38°. The positions of such diffraction peaks did not satisfy any desired ranges, and thus A/B could not be calculated.

The adsorption isotherms of $CO_2$ and $CH_4$ into the resulting GIS-type zeolite were measured, and thus the respective amounts of adsorption at 25° C. and 760 mmHg were as follows: $CO_2$: 1.08 cm³/g, $CH_4$: 0.2 cm³/g, and $N_2$: 0.2 cm³/g; and the adsorption selection rate (a/b) was 5.4 and the adsorption selection rate (a/c) was 5.4. The sodium concentration was 18.8% by mass, the aluminum concentration was 22.8% by mass, and no phosphorus was detected.

It was considered that, although the mixing time of starting materials was within a proper range, no aluminum was included in a starting material gel and thus no precursor was properly formed, and no GIS having the adsorption ability of $CO_2$ was produced.

Comparative Example 5

Starting material were mixed and subjected to hydrothermal synthesis by the same method as in Comparative Example 4 except that 2.34 g of sodium hydroxide was replaced by 3.28 g of potassium hydroxide. The resulting powder was subjected to XRD measurement, but no peak of a GIS-type zeolite was observed and no GIS-type zeolite was produced. It was considered that, although the mixing time of starting materials was within a proper range, no aluminum was included in a starting material gel and thus no precursor was properly formed, and no GIS-type zeolite was produced.

Comparative Example 6

A powdered zeolite was synthesized by the same method as in Example 1, and 1 g of the resulting zeolite was placed in 500 mL of an aqueous 0.1 N lithium nitrate solution, and stirred at 60° C. and 400 rpm for 3 hours. A product was subjected to filtration and dried at 120° C., and thereafter a powdered zeolite where the cation was partially exchanged with lithium was obtained.

From an XRD pattern of the resulting zeolite, a diffraction peak of (1 0 1) was exhibited at 12.52° and a diffraction peak of (3 1 2) was exhibited at 33.64°. The positions of such diffraction peaks did not satisfy any desired ranges, and thus A/B could not be calculated.

The adsorption isotherms of $CO_2$ and $CH_4$ into the resulting GIS-type zeolite were measured, and thus the respective amounts of adsorption at 25° C. and 760 mmHg were as follows: $CO_2$: 22.1 cm³/g, $CH_4$: 7.2 cm³/g, and $N_2$: 9.8 cm³/g; and the adsorption selection rate (a/b) was 3.1 and the adsorption selection rate (a/c) was 2.3. The alkali metal, alkaline earth, aluminum and phosphorus concentrations were measured by ICP-AES, and as a result, the aluminum concentration was 10.6% by mass, the lithium concentration was 11.8% by mass, the sodium concentration was 3.2% by mass, and no phosphorus was detected.

TABLE 1

| | Peak position (2θ [°]) | | K concentration | A/B | Amount of adsorption of $CO_2$ (cm³/g) | Amount of adsorption of $CH_4$ (cm³/g) | Amount of adsorption of $N_2$ (cm³/g) | Selectivity of adsorption $CO_2/CH_4$ (a/b) | $CO_2/N_2$ (a/c) |
|---|---|---|---|---|---|---|---|---|---|
| | (1 0 1) | (3 2 1) | % by mass | | | | | | |
| Example 1 | 12.74 | 34.1 | 12.2 | 1.9 | 64.2 | 0.9 | 0.8 | 71.3 | 80.3 |
| Example 2 | 12.62 | 34.02 | 3.8 | 1.8 | 32.2 | 0.2 | 0.3 | 161 | 107.3 |
| Example 3 | 12.78 | 34.18 | 12.4 | 2.1 | 67.5 | 0.5 | 0.6 | 135 | 112.5 |
| Comparative Example 1 | 12.44 | 33.4 | — | — | 0.67 | 0 | 0.1 | ∞ | 6.7 |
| Comparative Example 2 | 12.32 | 33.32 | — | — | 23.5 | 2.2 | 3.2 | 10.7 | 7.3 |
| Comparative Example 3 | 12.45 | 33.38 | — | — | 3.4 | 0 | 0.2 | ∞ | 17 |
| Comparative Example 4 | 12.45 | 33.38 | — | — | 1.08 | 0.2 | 0.2 | 5.4 | 5.4 |
| Comparative Example 5 | — | — | — | — | — | — | — | — | — |
| Comparative Example 6 | 12.52 | 33.64 | — | — | 22.1 | 7.2 | 9.8 | 3.1 | 2.3 |

The present application claims the priority based on Japanese Patent Application (Japanese Patent Application No. 2018-078435) filed on Apr. 16, 2018, the content of which is herein incorporated by reference.

INDUSTRIAL APPLICABILITY

The GIS-type zeolite according to the present invention has industrial applicability to separating agents or separation membranes for various gases and liquids, electrolyte membranes for fuel cells and the like, fillers of various resin molded articles, membrane reactors, catalysts for hydrocracking, alkylation and the like, catalyst carriers for carrying metals, metal oxides, and the like, adsorbing materials, desiccants, detergent aids, ion exchangers, waste water treatment agents, fertilizers, food additives, cosmetic additives, and the like.

REFERENCE SIGNS LISTS

1 adsorbing material
2 container
3 filter
4 zeolite particle

The invention claimed is:

1. A GIS-type zeolite, having a diffraction peak of (1 0 1) at a diffraction angle $2\theta$=12.55 to 12.90° in a spectrum obtained by X-ray diffraction.

2. The GIS-type zeolite according to claim 1, having a diffraction peak of (3 1 2) at $2\theta$=33.70 to 34.25° in a spectrum obtained by X-ray diffraction.

3. The GIS-type zeolite according to claim 1, having a potassium atom content of 3% by mass or more.

4. The GIS-type zeolite according to claim 1, wherein, when heights of peaks at $2\theta$=12.55 to 12.90° and at 21.7 to 22.2° in a spectrum obtained by X-ray diffraction are defined as A and B, respectively, 1.37<A/B<2.80 is satisfied.

5. The GIS-type zeolite according to claim 1, wherein the GIS-type zeolite is silica/alumina.

6. An adsorbing material comprising the GIS-type zeolite according to claim 1.

7. A separation method comprising separating one or more selected from the group consisting of $CO_2$, $H_2O$, He, Ne, $Cl_2$, $NH_3$, and HCl from a mixture comprising two or more gases selected from the group consisting of $H_2$, $N_2$, CO, and hydrocarbon by use of the adsorbing material according to claim 6.

8. The separation method according to claim 7, wherein the gas separation is performed by a pressure swing-type adsorption-separation method, a temperature swing-type adsorption-separation method, or a pressure/temperature swing-type adsorption-separation method.

* * * * *